United States Patent
Woodward, Jr. et al.

(10) Patent No.: US 9,645,271 B2
(45) Date of Patent: *May 9, 2017

(54) MULTIPLE RECEIVER LINE DEPLOYMENT AND RECOVERY

(71) Applicant: Fairfield Industries Incorporated, Sugar Land, TX (US)

(72) Inventors: Reagan Neil Woodward, Jr., Sugar Land, TX (US); James N. Thompson, Sugar Land, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 493 days.

This patent is subject to a terminal disclaimer.

(21) Appl. No.: 14/106,478

(22) Filed: Dec. 13, 2013

(65) Prior Publication Data
US 2014/0104983 A1    Apr. 17, 2014

Related U.S. Application Data

(63) Continuation of application No. 13/671,645, filed on Nov. 8, 2012, now Pat. No. 8,611,181, which is a
(Continued)

(51) Int. Cl.
*G01V 1/38* (2006.01)
*B63C 11/52* (2006.01)
(Continued)

(52) U.S. Cl.
CPC ............ *G01V 1/3852* (2013.01); *B63B 25/28* (2013.01); *B63B 27/10* (2013.01); *B63C 11/52* (2013.01);
(Continued)

(58) Field of Classification Search
CPC ............ G01V 1/3808; B63B 3/48; B63B 3/70
(Continued)

(56) References Cited

U.S. PATENT DOCUMENTS 4,905,404 A    3/1990    Pasion et al.
5,253,223 A    10/1993    Svenning et al.
(Continued)

FOREIGN PATENT DOCUMENTS

WO    WO-01/73477 A2    10/2001
WO    WO-02/46793 A1    6/2002

OTHER PUBLICATIONS

Final Office Action issued in related U.S. Appl. No. 12/343,136, dated Apr. 25, 2011, 8 pages.
(Continued)

*Primary Examiner* — Ian J Lobo
(74) *Attorney, Agent, or Firm* — Foley & Lardner LLP; James De Vellis

(57) ABSTRACT

Embodiments described herein relate to an apparatus and method of transferring seismic equipment to and from a marine vessel and subsurface location. In one embodiment, a marine vessel is provided. The marine vessel includes a deck having a plurality of seismic sensor devices stored thereon, two remotely operated vehicles, each comprising a seismic sensor storage compartment, and a seismic sensor transfer device comprising a container for transfer of one or more of the seismic sensor devices from the vessel to the sensor storage compartment of at least one of the two remotely operated vehicles.

25 Claims, 8 Drawing Sheets

Related U.S. Application Data continuation of application No. 12/343,136, filed on Dec. 23, 2008, now Pat. No. 8,310,899.

(51) Int. Cl.
  *G05D 1/02* (2006.01)
  *B63B 25/28* (2006.01)
  *B63B 27/10* (2006.01)

(52) U.S. Cl.
  CPC .......... *G01V 1/3808* (2013.01); *G01V 1/3843* (2013.01); *G05D 1/0206* (2013.01); *G01V 2210/1427* (2013.01)

(58) Field of Classification Search
  USPC .............................. 367/15; 114/364; 405/190
  See application file for complete search history.

(56) References Cited

U.S. PATENT DOCUMENTS

| | | | |
|---|---|---|---|
| 5,271,953 | A | 12/1993 | Litteral |
| 5,442,590 | A | 8/1995 | Svenning et al. |
| 5,811,055 | A | 9/1998 | Geiger |
| 6,350,085 | B1 | 2/2002 | Bath et al. |
| 6,456,565 | B1 | 9/2002 | Grall et al. |
| 6,474,254 | B1 | 11/2002 | Ambs et al. |
| 6,588,980 | B2 | 7/2003 | Worman et al. |
| 6,612,397 | B2 | 9/2003 | Sparrevik et al. |
| 6,625,083 | B2 | 9/2003 | Vandenbroucke |
| 6,657,921 | B1 | 12/2003 | Ambs |
| 6,951,138 | B1 | 10/2005 | Jones |
| 6,975,560 | B2 | 12/2005 | Berg et al. |
| 6,992,951 | B2 | 1/2006 | O'Brien et al. |
| 7,210,556 | B2 | 5/2007 | Bath et al. |
| 7,254,093 | B2 | 8/2007 | Ray et al. |
| 7,632,043 | B2 | 12/2009 | Thompson et al. |
| 8,127,706 | B2 | 3/2012 | Thompson et al. |
| 8,310,899 | B2 | 11/2012 | Woodard et al. |
| 8,534,959 | B2 | 9/2013 | Thompson et al. |
| 8,579,545 | B2 * | 11/2013 | Jewell .................. F16L 1/16 405/158 |
| 8,611,181 | B2 | 12/2013 | Woodward et al. |
| 2001/0028041 | A1 | 10/2001 | Hubbard |
| 2002/0172562 | A1 | 11/2002 | Worman et al. |
| 2003/0218937 | A1 | 11/2003 | Berg et al. |
| 2005/0052951 | A1 | 3/2005 | Ray et al. |
| 2005/0155814 | A1 | 7/2005 | Bath et al. |
| 2005/0276665 | A1 | 12/2005 | Entralgo et al. |
| 2006/0120216 | A1 | 6/2006 | Ray et al. |
| 2006/0159524 | A1 | 7/2006 | Thompson et al. |
| 2006/0243189 | A1 | 11/2006 | Thompson et al. |
| 2006/0286931 | A1 | 12/2006 | Rhodes et al. |
| 2007/0070808 | A1 | 3/2007 | Ray et al. |
| 2007/0248417 | A1 | 10/2007 | Berg |
| 2007/0258774 | A1 | 11/2007 | Thompson et al. |
| 2008/0041296 | A1 | 2/2008 | Thompson et al. |
| 2008/0049554 | A1 | 2/2008 | Crice et al. |
| 2008/0144442 | A1 | 6/2008 | Combee et al. |
| 2008/0279636 | A1 | 11/2008 | Ray et al. |
| 2009/0037145 | A1 | 2/2009 | Suzuki et al. |
| 2009/0052992 | A1 | 2/2009 | Thompson et al. |
| 2011/0158040 | A1 | 6/2011 | Kooper et al. |
| 2013/0204456 | A1 | 8/2013 | Tippelhofer et al. |

OTHER PUBLICATIONS

International Preliminary Report on Patentability and Written Opinion of the International Searching Authority for Application No. PCT/US2009/069037, dated Jun. 29, 2011, 7 pages.
International Search Report and Written Opinion of the International Searching Authority mailed Nov. 19, 2008 for PCT/US2008/072469, 7 pages.
International Search Report Application No. PCT/US2009/069037, dated Aug. 5, 2010, 1 page.
Non-Final Office Action dated Jun. 3, 2013 in related U.S. Appl. No. 13/671,645, 9 pages.
Non-Final Office Action in related U.S. Appl. No. 12/343,136, dated Nov. 22, 2010, 7 pages.
Notice of Allowance dated Oct. 30, 2013 in related U.S. Appl. No. 13/671,645, 9 pages.
US Office Action on U.S. Appl. No. 14/106,489 dated Oct. 23, 2015.
US Office Action on U.S. Appl. No. 13/790,284 dated Dec. 17, 2015.
Non-Final Office Action in U.S. Appl. No. 14/106,489 dtd Dec. 23, 2014 (13 pages).
US Office Action on U.S. Appl. No. 14/106,489 DTD Apr. 3, 2015.
Non-Final Office Action on U.S. Appl. No. 14/106,489 mailed Jul. 10, 2015.
Final Office Action for U.S. Appl. No. 12/343,136 dated Apr. 25, 2011.
Office Action issued in U.S. Appl. No. 12/343,136 dated Nov. 22, 2010.
Notice of Allowance issued in U.S. Appl. No. 12/343,136 dated Aug. 21, 2012.
Notice of Allowance issued in U.S. Appl. No. 13/671,645 dated Oct. 30, 2013.
Office Action issued in U.S. Appl. No. 14/106,489 dated Feb. 16, 2016.
Notice of Allowance on U.S. Appl. No. 13/790,284 dated Jun. 6, 2016.
Office Action on U.S. Appl. No. 14/106,489 dated May 13, 2016.

\* cited by examiner

MULTIPLE RECEIVER LINE DEPLOYMENT AND RECOVERY

CROSS-REFERENCES TO RELATED APPLICATIONS

This application claims the benefit of priority under 35 U.S.C. §120 as a continuation of U.S. patent application Ser. No. 13/671,645 filed Nov. 8, 2012, which claims the benefit of priority under 35 U.S.C. §120 as a continuation of U.S. patent application Ser. No. 12/343,136 filed Dec. 23, 2008, each of which are incorporated by reference herein in their entirety.

FIELD OF THE INVENTION

Embodiments described herein relate to the field of seismic exploration in a marine environment. More particularly, to an apparatus and method of transferring seismic equipment to and from an operations platform and an underwater location.

DESCRIPTION OF THE RELATED ART

Seismic exploration in deep water typically utilizes seismic sensor devices stored on a first marine vessel that are transferred from the first vessel and placed on or near the seafloor or seabed. These devices are typically referred to as Ocean Bottom Cabling (OBC) or Ocean Bottom Seismometer (OBS) systems, such as Seafloor Seismic Recorders (SSR's). These SSR devices contain seismic sensors and electronics in sealed packages, and record seismic data on-board the devices while deployed on the seabed as opposed to digitizing and transmitting the data to an external recorder while deployed. The recorded data is obtained by retrieving the devices from the seabed to a location on the first vessel and downloading the recorded data from the devices to a recorder while onboard the first vessel.

In typical operation, hundreds or thousands of OBS units are deployed from the first vessel to the seabed from the first vessel. In one conventional method, the OBS units are deployed using a remotely operated vehicle (ROV) tethered to the first vessel. The ROV is lowered below the surface of the water and positioned subsurface. One or more OBS units are placed by the ROV on the seabed at predetermined locations in a linear row, which may be known as a receiver line. When at least one receiver line consisting of a suitable number of the OBS units is formed, a seismic survey may be performed by providing a source signal, such as an acoustic or vibrational signal. Reflected signals from the seabed and underlying structures are recorded on the one or more OBS units. The source signal or "shot" is typically provided by a second marine vessel, which may be known as a gun boat.

In the deployment of the OBS units, the speed at which the OBS units can be deployed is primarily limited to the speed at which the equipment can be towed through the water. Specifically, support equipment for the ROV, such as an umbilical cable and a tether management system (TMS) have large drag coefficients. The drag of these components typically limit the speed of the first vessel. Thus, the number of OBS units that can be deployed or retrieved in a given time period is limited. The deployment time also affects the efficiency of the seismic survey as the second vessel must wait until the at least one receiver line is laid prior to shooting. The first vessel continues laying other receiver lines while the second vessel is shooting, but as shooting is often completed prior to completion of the next receiver line, the second vessel must again wait until the second receiver line is formed.

Therefore, what is needed is a method and apparatus for transferring seismic sensor devices to and from the first vessel and/or the ROV in a manner that maximizes the number of seismic sensor devices deployed and retrieved, and provides a buffer for a second vessel.

SUMMARY OF THE INVENTION

Embodiments described herein relate to an apparatus and method of transferring seismic sensor devices to and from a marine vessel and subsurface location.

In one embodiment, a marine vessel is provided. The marine vessel includes a deck having a plurality of seismic sensor devices stored thereon, two remotely operated vehicles, each comprising a seismic sensor storage compartment, and a seismic sensor transfer device comprising a container for transfer of one or more of the seismic sensor devices from the vessel to the sensor storage compartment of at least one of the two remotely operated vehicles.

In another embodiment, a marine vessel is provided. The marine vessel includes at least three cranes disposed thereon, a plurality of seismic sensor devices stored on the deck, a remotely operated vehicle coupled to the vessel, the remotely operated vehicle comprising a seismic sensor storage compartment, and a seismic sensor transfer device comprising a container for transfer of one or more seismic sensor devices from the vessel to the remotely operated vehicle.

In another embodiment, a method for performing a seismic survey in a marine environment is provided. The method includes deploying a first remotely operated vehicle from a first vessel moving in a direction, deploying a seismic sensor transfer device from the first vessel having a plurality of sensor devices disposed therein, transferring the plurality of sensor devices from the seismic sensor transfer device to a sensor storage compartment of the first remotely operated vehicle at a subsurface location, and placing each of the first plurality of sensor devices in selected locations in the marine environment using the first remotely operated vehicle.

In another embodiment, a method for performing a seismic survey in a marine environment is provided. The method includes deploying a first remotely operated vehicle from a first vessel, the first vessel powered to operate in a direction at a speed greater than zero knots, placing a first plurality of sensor devices in selected locations in the marine environment using the first remotely operated vehicle, deploying a seismic sensor storage container from the first vessel having a second plurality of sensor devices disposed thereon, and transferring the second plurality of sensor devices to the first remotely operated vehicle at a subsurface location.

In another embodiment, a method for deploying seismic sensor devices in a marine environment is provided. The method includes deploying a remotely operated vehicle from a vessel, powering the vessel to operate at a first speed in a first direction, the first speed being greater than zero knots, operating the remotely operated vehicle at a second speed to deploy a first plurality of sensor devices, the second speed being greater than the first speed at intermittent intervals, wherein the remotely operated vehicle deploys the first plurality of sensor devices in a pattern relative to the first direction of the vessel, deploying a seismic sensor container from the vessel, the seismic sensor container having a second plurality of sensor devices disposed thereon, and transferring the second plurality of sensor devices onto the remotely operated vehicle.

In another embodiment, a method for deploying a plurality of sensor devices in a marine environment is provided. The method includes deploying at least a first remotely operated vehicle from a vessel, the first remotely operated vehicle comprising an onboard sensor storage compartment, loading the onboard sensor storage compartment with a plurality of sensor devices, operating the vessel in a first direction, and placing the sensor devices in a pattern in the marine environment, wherein the pattern comprises at least three linear rows of sensor devices relative to the first direction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is also contemplated that elements disclosed in one embodiment may be beneficially utilized on other embodiments without specific recitation.

DETAILED DESCRIPTION

Embodiments described herein relate to an apparatus and method for transferring one or more seismic sensor devices to or from a marine vessel on a surface of a body of water and a subsurface marine location using a remotely operated vehicle (ROV). The ROV may be an autonomous underwater vehicle (AUV) or any apparatus capable of operating autonomously or semi-autonomously in a marine environment. The marine vessel may be a boat, a ship, a barge or a floating platform adapted to store and transfer a plurality of seismic sensor devices. Each of the seismic sensor devices as described herein may be a discrete subsurface sensor, for example, sensors and/or recorders, such as ocean bottom seismometers (OBS), seafloor seismic recorders (SSR), and similar devices. SSR's are typically re-usable and may be recharged and serviced before re-deployment. The seismic sensor devices may be configured to communicate by wireless connections or configured to communicate through cables. The seismic sensor devices contain seismic sensors and electronics in sealed packages, and record seismic data within an on-board recorder while deployed on the seabed as opposed to digitizing and transmitting the data to an external recorder. The recorded data is obtained by retrieving the seismic sensor devices from the seabed using the ROV or AUV.

Figure 1:
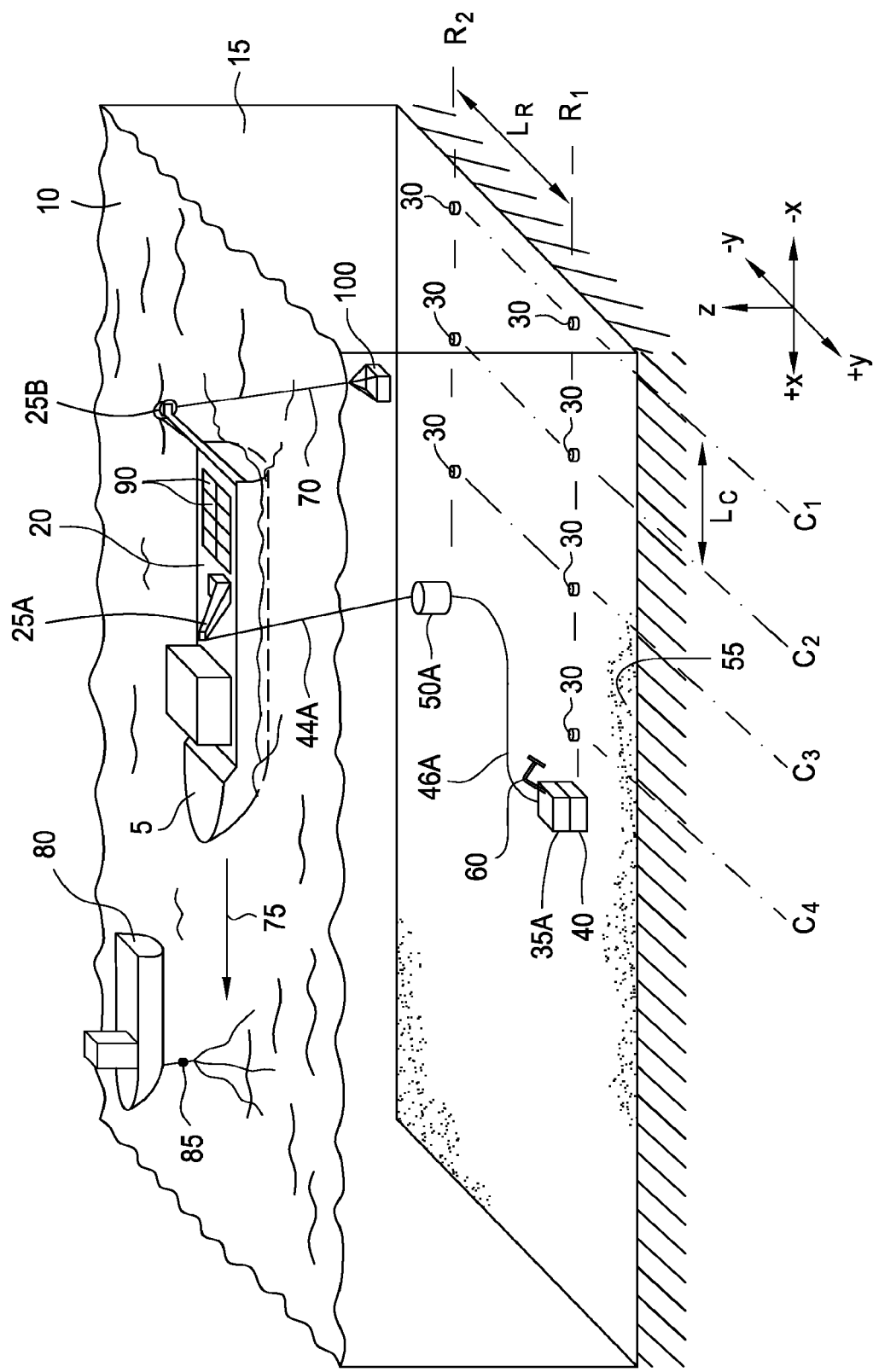
FIG. 1 is an isometric schematic view of one embodiment of a seismic operation in deep water.

FIG. 1 is an isometric schematic view of one embodiment of a seismic operation in deep water facilitated by a first marine vessel 5. The first vessel 5 is positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices and/or sensor recharging devices.

The deck 20 also includes one or more cranes 25A, 25B attached thereto to facilitate transfer of at least a portion of the operational equipment, such as an ROV and/or seismic sensor devices, from the deck 20 to the water column 15. For example, a crane 25A coupled to the deck 20 is configured to lower and raise an ROV 35A, which transfers and positions one or more sensor devices 30 on a seabed 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B is coupled to a stern of the first vessel 5, or other locations on the first vessel 5. Each of the cranes 25A, 25B may be any lifting device and/or launch and recovery system (LARS) adapted to operate in a marine environment. In this embodiment, the crane 25B is coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. In one embodiment, the transfer device 100 is configured as a sensor device storage rack for transfer of sensor devices 30 from the first vessel 5 to the ROV 35A, and from the ROV 35A to the first vessel 5. The transfer device 100 may include an on-board power supply, a motor or gearbox, and/or a propulsion system (all not shown). Alternatively, the transfer device 100 may not include any integral power devices and/or not require any external or internal power source. If needed, the cable 70 may provide power and/or control to the transfer device 100. Alternatively, the cable 70 may be an umbilical, a tether, a cord, a wire, a rope, and the like, that is configured solely for support of the transfer device 100.

The ROV 35A includes a seismic sensor device storage compartment 40 that is configured to store one or more seismic sensor devices 30 therein for a deployment and/or retrieval operation. The storage compartment 40 may be a magazine, a rack, or a container configured to store the seismic sensor devices. The storage compartment 40 may also include a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. In this embodiment, the ROV 35A may be positioned at a predetermined location above or on the seabed 55 and seismic sensor devices 30 are rolled, conveyed, or otherwise moved out of the storage compartment 40 at the predetermined location. In another embodiment, the seismic sensor devices 30 may be deployed and retrieved from the storage compartment 40 by a robotic device 60, such as a robotic arm, an end effector or a manipulator, disposed on the ROV 35A.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer device 100 is preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather and/or rough sea conditions. Thus, safety of personnel and lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A utilizes commands from personnel on the first vessel 5 to retrieve each seismic sensor device 30 that was previously placed on seabed 55. The retrieved seismic sensor devices 30 are placed into the storage compartment 40 of the ROV 35A. In one embodiment, the ROV 35A may be sequentially positioned adjacent each seismic sensor device 30 on the seabed 55 and the seismic sensor devices 30 are rolled, conveyed, or otherwise moved from the seabed 55 to the storage compartment 40. In another embodiment, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for and/or include drift caused by wave action, current(s) and/or wind speed and direction. In one embodiment, the plurality of seismic sensor devices 30 are placed on the seabed 55 in selected locations, such as a plurality of rows $R_n$ in the X direction ($R_1$ and $R_2$ are shown) and/or columns $C_n$ in the Y direction ($C_1$-$C_3$ are shown), wherein n equals an integer. In one embodiment, the rows $R_n$ and columns $C_n$ define a grid or array, wherein each row $R_n$, comprises a receiver line in the width of a sensor array (X direction) and/or each column $C_n$ comprises a receiver line in a length of the sensor array (Y direction). The distance between adjacent sensor devices 30 in the rows is shown as distance $L_R$ and the distance between adjacent sensor devices 30 in the columns is shown as distance $L_C$. While a substantially square pattern is shown, other patterns may be formed on the seabed 55. Other patterns include non-linear receiver lines and/or non-square patterns. The pattern(s) may be pre-determined or result from other factors, such as topography of the seabed 55. In one embodiment, the distances $L_R$ and $L_C$ may be substantially equal and may include dimensions between about 60 meters to about 400 meters, or greater. The distance between adjacent seismic sensor devices 30 may be predetermined and/or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions and/or currents in the water column 15. As the components of the ROV 35A are subject to drag that is dependent on the depth of the components in the water column 15, the first vessel speed may operate in a range of less than about 1 knot. In this embodiment, wherein two receiver lines (rows $R_1$ and $R_2$) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, and/or currents in the water column 15.

During a seismic survey, one receiver line, such as row $R_1$ may be deployed. When the single receiver line is completed a second vessel 80 is used to provide a source signal. The second vessel 80 is provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row $R_1$ in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

In this embodiment, the first vessel 5 utilizes one ROV 35A to lay sensor devices to form a first set of two receiver lines (rows $R_1$ and $R_2$) in any number of columns, which may produce a length of each receiver line of up to and including several miles. In one embodiment, the two receiver lines (rows $R_1$ and $R_2$) are substantially parallel. When a single directional pass of the first vessel 5 is completed and the first set (rows $R_1$, $R_2$) of seismic sensor devices 30 are laid to a predetermined length, the second vessel 80, provided with the source device 85, is utilized to provide the source signal. The second vessel 80 is typically required to make eight or more passes along the two receiver lines to complete the seismic survey of the two rows $R_1$ and $R_2$.

While the second vessel 80 is shooting along the two rows $R_1$ and $R_2$, the first vessel 5 may turn 180 degrees and travel in the −X direction in order to lay seismic sensor devices 30 in another two rows adjacent the rows $R_1$ and $R_2$, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows $R_1$ and $R_2$ are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A and/or the spacing (distance $L_R$) between sensor devices 30.

Figure 2:
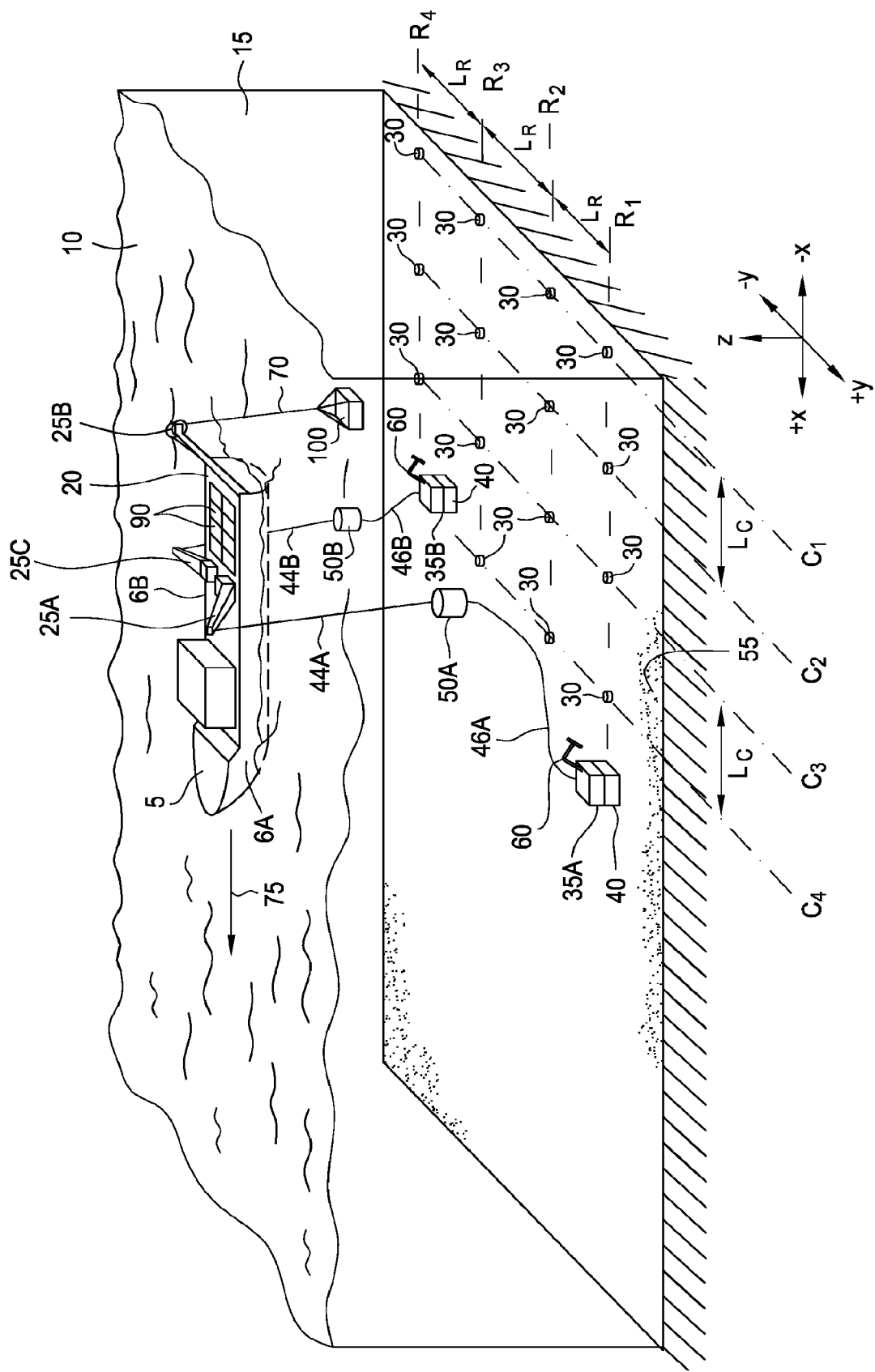
FIG. 2 is an isometric schematic view of another embodiment of a seismic operation in deep water.

FIG. 2 is an isometric schematic view of another embodiment of a seismic operation in deep water facilitated by the first vessel 5. In this embodiment, the first vessel 5 has multiple ROV's operating therefrom. In FIG. 2, by way of example and not limitation, two ROV 35A and ROV 35B are shown. Each of the ROV's 35A, 35B include a respective TMS 50A, 50B, tether 46A, 46B, and umbilical cable 44A, 44B. The first ROV 35A is coupled to the first crane 25A on the port side 6A of the first vessel 5 and the second ROV 35B is coupled to a third crane 25C on the starboard side 6B of the first vessel 5.

The first ROV 35A and the second ROV 35B are configured to provide a layout pattern for the plurality of sensor devices 30 on the seabed 55 on both sides of the first vessel 5. Each of the ROV's 35A and 35B may be controlled independently or synchronously to travel in a direction or course relative to the vessel 5 to deploy the sensor devices 30 on the seabed in a pre-determined pattern. In one aspect, each of the ROV's 35A and 35B deploy a plurality of rows and columns as described above. In the embodiment depicted in FIG. 2, rows $R_1$-$R_4$ and columns $C_1$-$C_4$ define, respectively, the width and the length of a seismic array.

In this embodiment, ROV 35A moves in a first pattern relative to the vessel direction 75 to deploy a plurality of rows of sensor devices 30 (rows $R_1$ and $R_2$ are shown) while ROV 35B moves in a second pattern relative to the vessel direction 75 to deploy a plurality of rows of sensor devices 30 (rows $R_3$ and $R_4$ are shown). The pattern of the first ROV 35A may be the same or different than the pattern of the second ROV 35B. The distance between adjacent sensor devices 30 in the rows $R_1$-$R_4$ is shown as distance $L_R$ and the distance between adjacent sensor devices 30 in the columns $C_1$-$C_4$ is shown as distance $L_C$. While a substantially square pattern is shown, other patterns may be formed on the seabed 55. Other patterns include non-linear receiver lines and/or non-square patterns. The pattern(s) may be pre-determined or result from other factors, such as topography of the seabed 55. In one embodiment, the distances $L_R$ and $L_C$ may be substantially equal and may include dimensions between about 60 meters to about 400 meters, or greater. The distance between adjacent seismic sensor devices 30 may be predetermined and/or result from topography of the seabed 55 as described above.

In the embodiment shown, the rows $R_1$-$R_4$ form a first set of four receiver lines and the rows are complete when a sufficient number of columns are provided. Once the first set is completed, the second vessel may provide the source signal. In this embodiment, the second vessel must make at least 16 passes to shoot the four rows $R_1$-$R_4$. During this time, the first vessel 5 is laying a second set of receiver lines, which may include four rows. Thus, the deployment time of the four receiver lines (rows $R_1$-$R_4$) by the vessel 5 is effectively reduced by about 25 percent as compared to deployment of a single receiver line. The minimized deployment time results in less idle time of the second vessel, which results in greater efficiency and reduced costs of the seismic survey.

As in the embodiment shown in FIG. 1, the rows $R_1$, $R_2$ formed by ROV 35A and rows $R_3$, $R_4$ formed by the ROV 35B are not limited as described and may consist of three, four, five, six, or greater number of rows. In one example, each of the ROV's 35A, 35B may lay four sensor devices 30 to form four rows such that eight sensor devices 30 comprise each column. In this example, when a sufficient number of columns are provided to form the rows, eight receiver lines define the present width of the array. The lateral pattern (Y direction) used to deploy each row is typically chosen to maintain forward motion of the vessel 5 and minimize stopping forward motion of the vessel 5. Thus the lateral pattern to deploy additional rows may be limited by the speed of the ROV's 35A, 35B, specifically the speed of the ROV's 35A, 35B in the Y direction. The lateral (Y direction) distance from the first vessel 5 is limited by a length of the tethers 46A, 46B. Thus, in one embodiment, the maximal distance for placement of seismic sensor devices 30 in rows $R_1$ and $R_4$ from the first vessel 5 is substantially equal to the length of the tethers 46A, 46B. In this embodiment, the maximal distance from the first vessel 5 where the seismic sensor devices 30 in rows $R_1$ and $R_4$ are positioned are between about 600 meters to about 1200 meters, or greater from the first vessel 5. In other embodiments, the maximal distance is between about 1000 meters to about 1600 meters from the first vessel 5.

Figure 3:
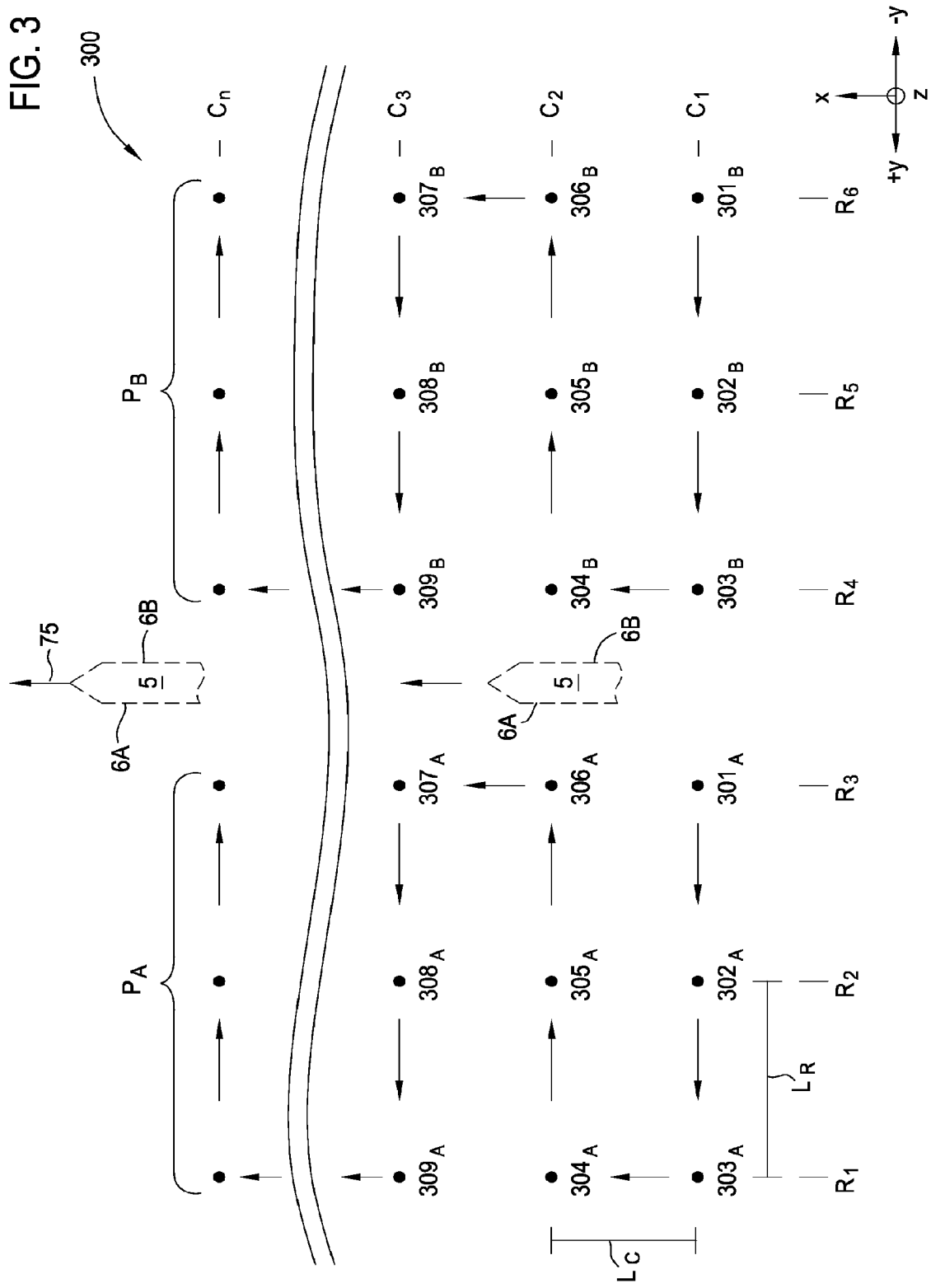
FIG. 3 is a schematic plan view of one embodiment of a seismic sensor device layout.

FIG. 3 is a schematic plan view of one embodiment of a seismic sensor device layout 300 which, in one embodiment, comprises a plurality of receiver lines (rows $R_1$-$R_6$). Points 301A-309A represent locations for placement of seismic sensor devices on a seabed along the port side 6A of the first vessel 5 and points 301B-309B represent locations for placement of seismic sensor devices on the seabed along the starboard side 6B of the first vessel 5. While not shown, an ROV operating on the port side 6A and an ROV operating on the starboard side 6B facilitate placement of the seismic sensor devices at the points 301A-309A and 301B-309B.

In this embodiment, seismic sensor device placement by the ROV 35A starts at point 301A on the port side 6A and placement of the seismic sensor devices by the ROV 35B on the starboard side 6B starts at point 301 B. The port side 6A and starboard side 6B placement then proceeds in the +Y direction to points 302A and 302B, respectively. The port side 6A pattern (and starboard side pattern) then proceeds in a +Y direction to point 303A (and point 303B), then in the X direction to point 304A (and point 304B), then in the −Y direction to point 305A and point 306A (points 305B and 306B). In this embodiment, identical X-Y patterns $P_A$ and $P_B$ are defined by points 301A-307A on the port side 6A and points 301B-307B on the starboard side 6B. A repeating X-Y pattern is then executed at 307A and 307B until a sufficient number of columns $C_n$ are formed.

Figure 4:
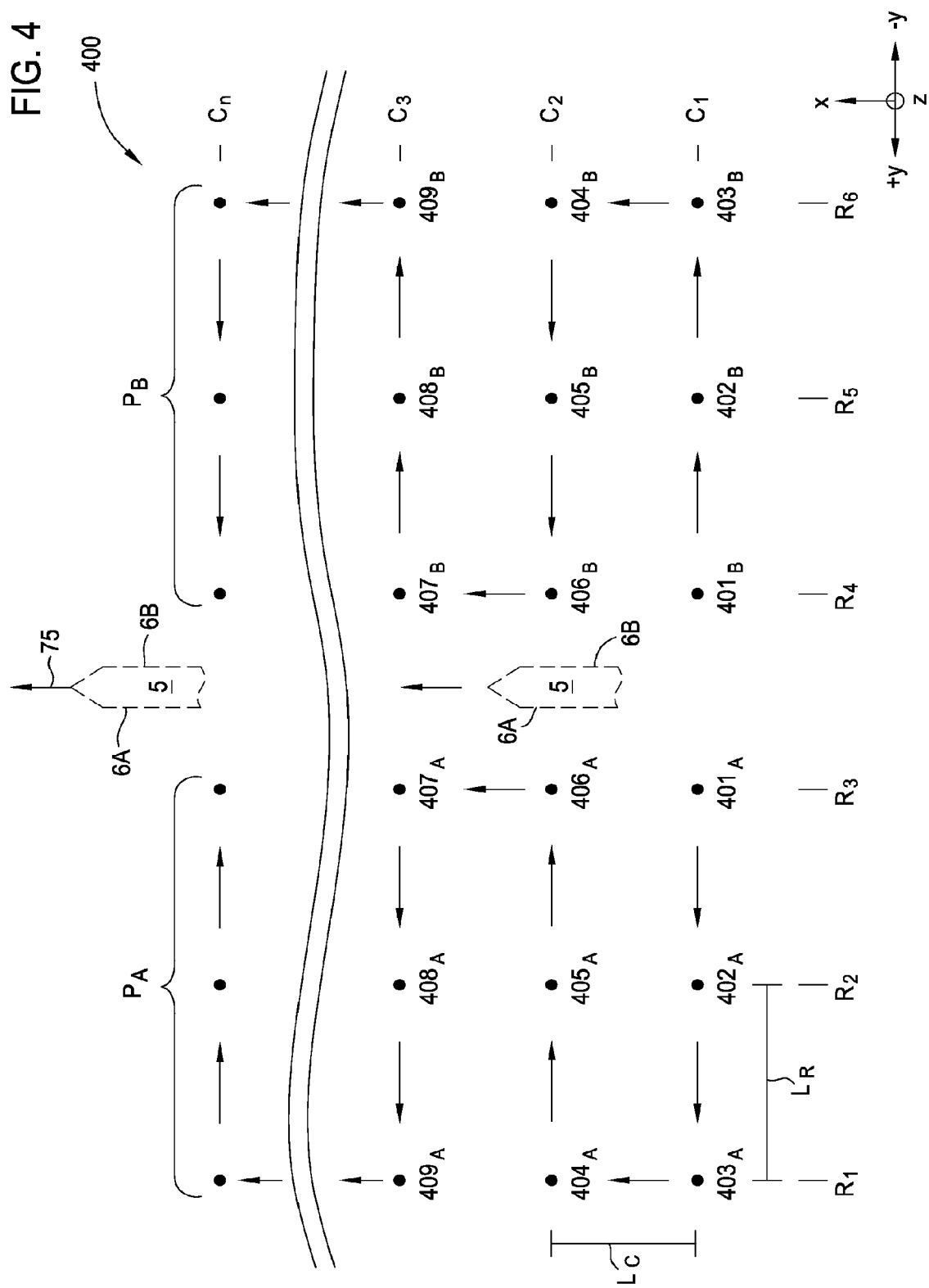
FIG. 4 is a schematic plan view of another embodiment of a seismic sensor device layout.

FIG. 4 is a schematic plan view of another embodiment of a seismic sensor device layout 400 which, in one embodiment, comprises a plurality of receiver lines (rows $R_1$-$R_6$). Points 401A-409A represent locations for placement of seismic sensor devices on a seabed along the port side 6A of the first vessel 5 and points 401B-409B represent locations for placement of seismic sensor devices on the seabed along the starboard side 6B of the first vessel 5. While not shown, an ROV operating on the port side 6A and an ROV operating on the starboard side 6B facilitate placement of the seismic sensor devices at the points 401A-409A and 401B-409B.

In this embodiment, the port side 6A placement by the ROV 35A starts at point 401A and the starboard side 6B placement by the ROV 35B starts at point 401B. The port side placement then proceeds in the +Y direction to point 402A and 403A, then in the X direction to point 404A, then in the −Y direction to point 405A and point 406A. The starboard side 6B placement proceeds in the -Y direction to point 402B and 403B, then in the X direction to point 404B, then in the +Y direction to 405B and 406B. In this embodiment, a mirror-image of X-Y patterns $P_A$ and $P_B$ are defined by points 401A-407A on the port side 6A and points 401B-407B on the starboard side 6B. A repeating mirrored X-Y pattern is then executed at 407A and 407B until a sufficient number of columns $C_n$ are formed.

Figure 5:
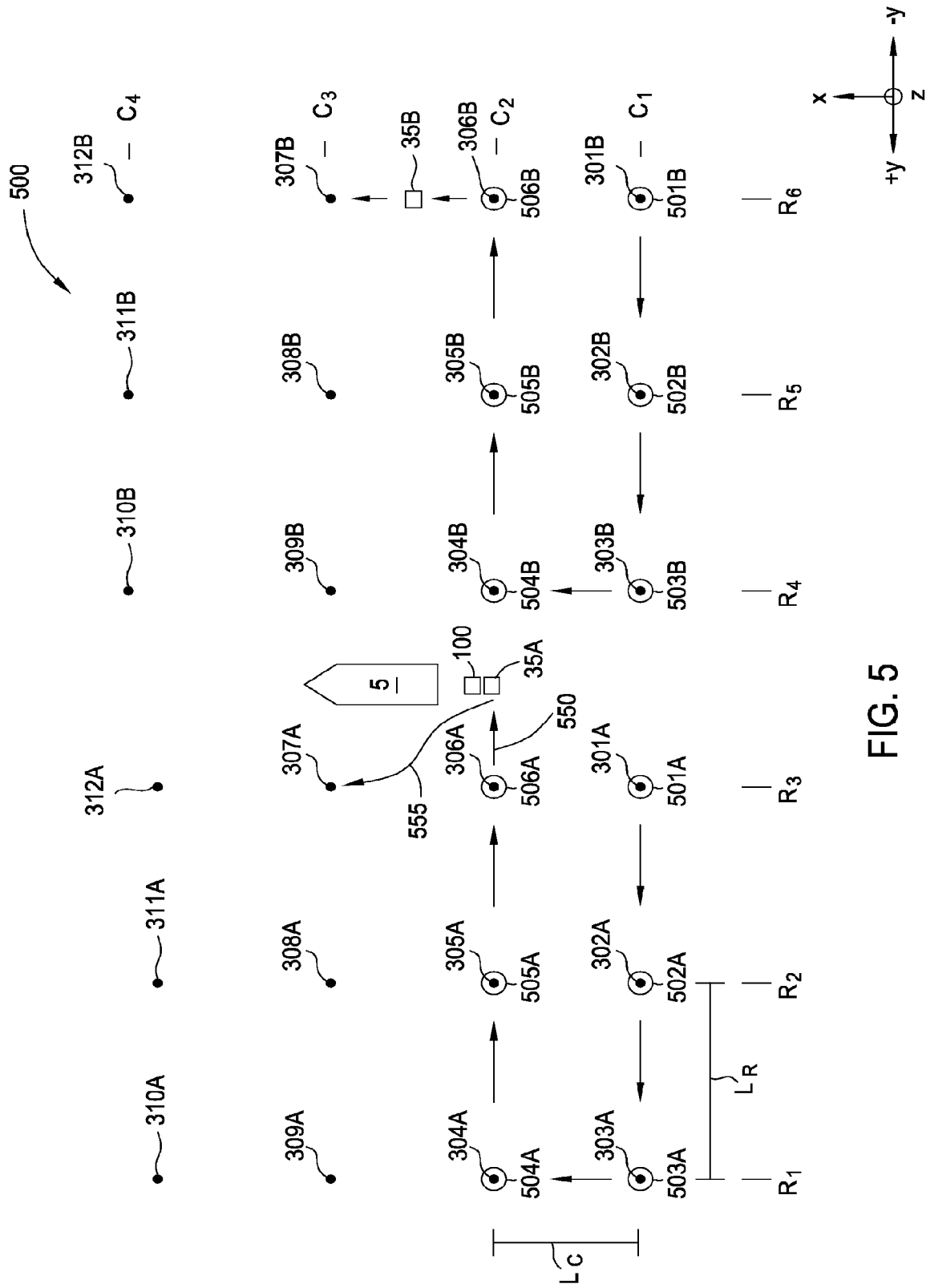
FIG. 5 is a schematic plan view of another embodiment of a seismic sensor device layout.

FIG. 5 is a schematic plan view of another embodiment of a seismic sensor device layout 500. The array layout is similar to the array layout 300 and pattern of FIG. 3 with the exception of sensor devices being laid over a portion of the points 301A-312A on the port side 6A of the first vessel 5 and a portion of the points 301B-312B on the starboard side 6B of the first vessel 5. The sensor devices that have been positioned on the respective points 301A-306A and 301B-306B are referenced as sensor devices 501A-506A on the port side 6A of the first vessel 5 and sensor devices 501B-506B on the starboard side 6B of the first vessel 5. Additionally, the port side 6A ROV 35A is shown as well as the starboard side 6B ROV 35B.

As described in FIGS. 1 and 2, each of the ROV's 35A, 35B include an integral storage compartment 40 which are not shown in the plan view of FIG. 5. In one embodiment, each of the storage compartments 40 contains a first plurality of seismic sensor devices 30. For example, the storage compartment 40 may have a capacity of about 14 seismic sensor devices. The sensor devices may be pre-loaded into each storage compartment 40 on the first vessel 5 for subsequent transfer to each point. Once the sensor devices have been laid on the points in the array layout 500, the storage compartments 40 are replenished without surfacing the ROV's 35A, 35B. In this embodiment, a transfer device 100 is towed behind the first vessel 5 to facilitate reloading of sensor devices in the storage compartment of ROV 35A. In one embodiment, the pre-loading and reloading of the storage compartments 40 of each ROV 35A, 35B with seismic sensor devices 30 are unequal to facilitate a staggered or alternating reloading operation between each ROV 35A, 35B.

In this embodiment, after sensor device 506A is deployed at point 306A, the ROV 35A is reloaded. The transfer device 100 is towed behind the first vessel 5 below the vessel 5. The ROV 35A may travel to the towed transfer device 100 in a course 550 to a position adjacent the transfer device 100. The ROV 35A and transfer device 100 are mated in a manner to transfer the seismic sensor devices to the storage compartment 40. While the ROV 35A is reloaded, the storage compartment 40 of the ROV 35B may not be depleted and continues deployment on the starboard side 6B. In this embodiment, the ROV 35A is reloaded with additional sensor devices by the transfer device 100 while the ROV 35B continues deployment of sensor devices. After the storage compartment of ROV 35A is reloaded, the ROV 35A and transfer device 100 are detached and the ROV 35A travels in a course 555 toward the next deployment point 307A. Each of the courses 550, 555 may be a lateral direction, a diagonal direction, or a linear or serpentine path. The reloading operation is staggered between the ROV's 35A and 35B to enhance efficiency of the deployment of the array. During reloading, the first vessel 5 may be stopped, slowed or maintained at a speed that was used during deployment of seismic sensor devices along the array.

Figure 6:
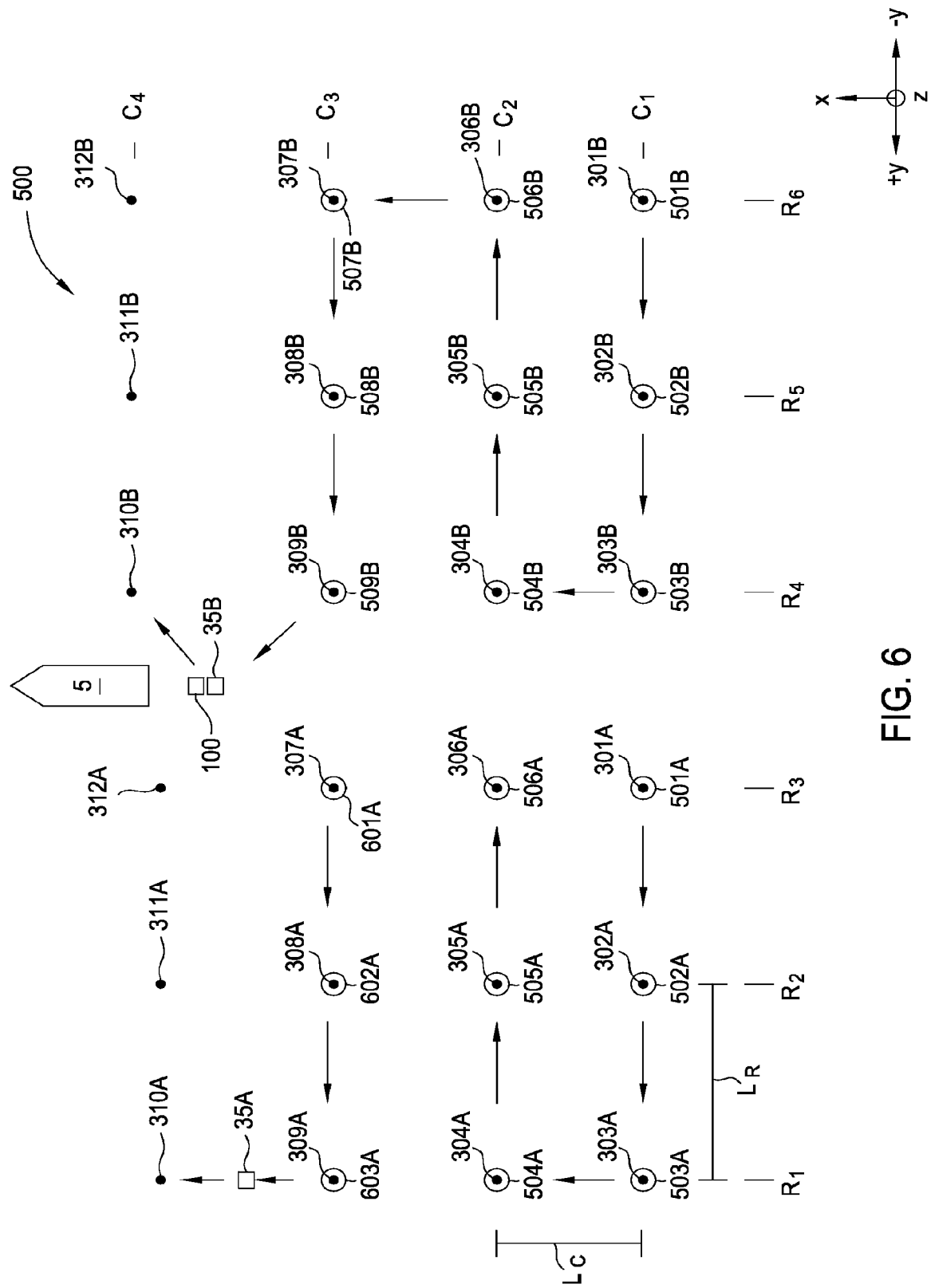
FIG. 6 is a schematic plan view showing a continuation of the seismic sensor device layout of FIG. 5.

FIG. 6 is a schematic plan view showing a continuation of the seismic sensor device layout 500 of FIG. 5. In this embodiment, after sensor device 509B is deployed at point 309B, the ROV 35B is reloaded. ROV 35A, which has been reloaded with a second plurality of sensor devices as shown in FIG. 5, continues deployment on the port side 6A (shown as sensor devices 601A-603A). In this embodiment, the ROV 35B is reloaded with a second plurality of sensor devices by the transfer device 100 while the ROV 35A continues deployment of sensor devices.

Figure 7:
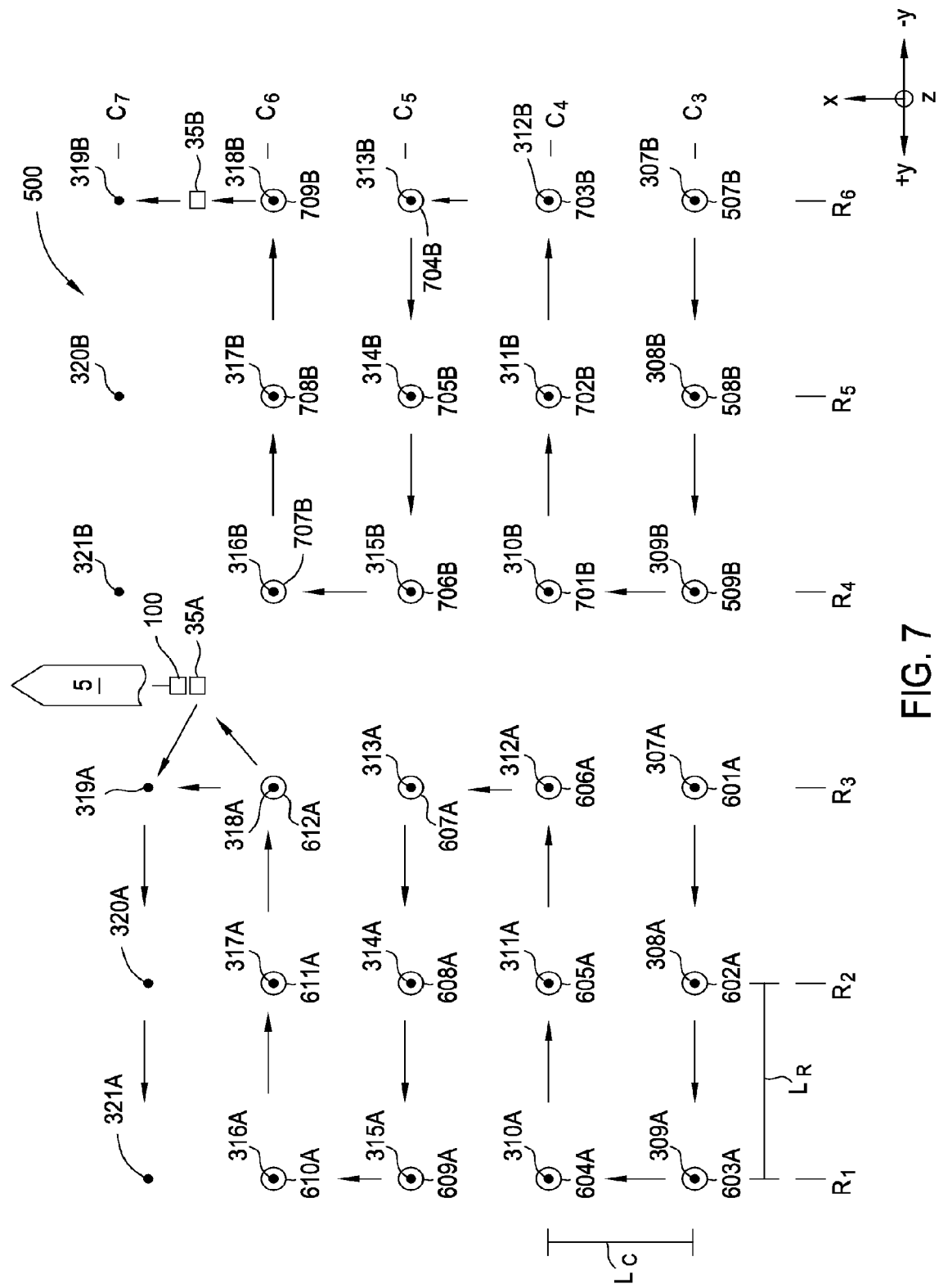
FIG. 7 is a schematic plan view showing a continuation of the seismic sensor device layout of FIG. 6.

FIG. 7 is a schematic plan view showing a continuation of the seismic sensor device layout 500 of FIG. 6. In this embodiment, after sensor device 612A is deployed at point 318A, the ROV 35A is reloaded. ROV 35B, which has been reloaded with a second plurality of sensor devices, continues deployment on the starboard side 6B (shown as sensor devices 701B-709B). In this embodiment, the ROV 35A is reloaded with a third plurality of sensor devices by the transfer device 100 while the ROV 35B continues deployment of sensor devices.

As shown in the embodiments of FIGS. 5-7, eighteen sensor devices have been deployed at points 301A-318A by ROV 35A and eighteen sensor devices have been deployed at points 301B-318B by ROV 35B for a total of thirty six sensor devices in one-pass of the vessel. The reloading operation to replenish the ROV storage compartment is alternated between the ROV's 35A, 35B to enhance efficiency of the layout of the array. During the deployment of the rows, the speed of the first vessel 5 may be maintained at a substantially constant speed.

In one operational embodiment, an example of deploying sensor devices using the embodiments described in FIGS. 5-7 will be described. The first vessel 5 speed may be maintained or averaged at about 0.25 knots along direction 75 while a port side 6A ROV 35A and a starboard side ROV 35B may be operated at speeds of less than about 10 knots. The distances $L_R$ and $L_C$ between points may be about 400 meters. A first plurality of sensor devices 30, consisting of six sensor devices, may be preloaded into ROV 35A and a first plurality of sensor devices 30, consisting of nine sensor devices, may be preloaded into ROV 35B. Seismic sensor devices 501A-506A may be deployed and ROV 35A should be reloaded with a second plurality of seismic sensor devices as shown in FIG. 5. The second plurality of seismic sensor devices may comprise twelve sensor devices. In this embodiment, the first vessel 5 may be maintained at about 0.25 knots during the reloading operation.

The first vessel 5 proceeds in the direction 75 and ROV 35A continues deployment of seismic sensor devices beginning at point 307A while ROV 35B places a seismic sensor device 507B at point 307B as shown in FIG. 6. Both ROV's 35A and 35B may continue deployment along the patterns until deployment of seismic sensor device 509B by ROV 35B.

After deployment of seismic sensor device 509B by ROV 35B, ROV 35B may be reloaded with a second plurality of seismic sensor devices, as shown in FIG. 6. The second plurality of sensor devices may comprise another twelve seismic sensor devices. The first vessel 5 may be maintained at about 0.25 knots during the reloading operation. The first vessel 5 proceeds in the direction 75 and ROV 35B may continue deployment of seismic sensor devices beginning at point 310B while ROV 35A places a seismic sensor device 604A at point 310A as shown in FIG. 7. Both ROV's 35A, 35B may continue deployment along the pattern as shown. After ROV 35A deploys a sensor device 612A at point 318A, the ROV 35A may be reloaded with a third plurality of seismic sensor devices, for example, another twelve seismic sensor devices. The pattern may continue until a sufficient number of columns are completed. After completion, the second vessel (not shown) may begin shooting, which may involve at least 24 passes of the second vessel. During the shooting, the first vessel may begin another one pass lay of another six receiver lines.

Figure 8:
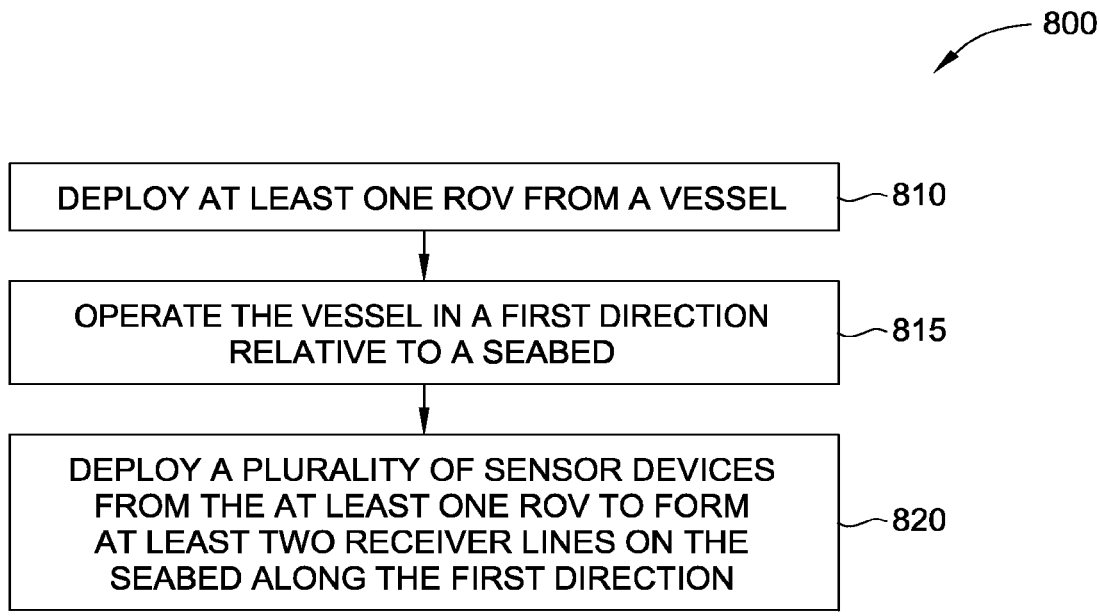
FIG. 8 is a flow chart showing one embodiment of a deployment method.

FIG. 8 is a flow chart showing one embodiment of a deployment method 800. The method 800 may be used to deploy a plurality of seismic sensor receiver lines in one pass of a first vessel as described in the above embodiments. At 810, at least one ROV is deployed from a vessel. At 815, the vessel is operated in a first direction relative to a seabed. The first direction may be a compass heading or other linear or substantially linear direction. At 820, a plurality of seismic sensor devices are deployed from the at least one ROV to form at least two receiver lines on the seabed along the first direction. In one embodiment, the at least two receiver lines are substantially parallel to the first direction. In another embodiment, the at least two receiver lines are substantially parallel to each other.

Figure 9:
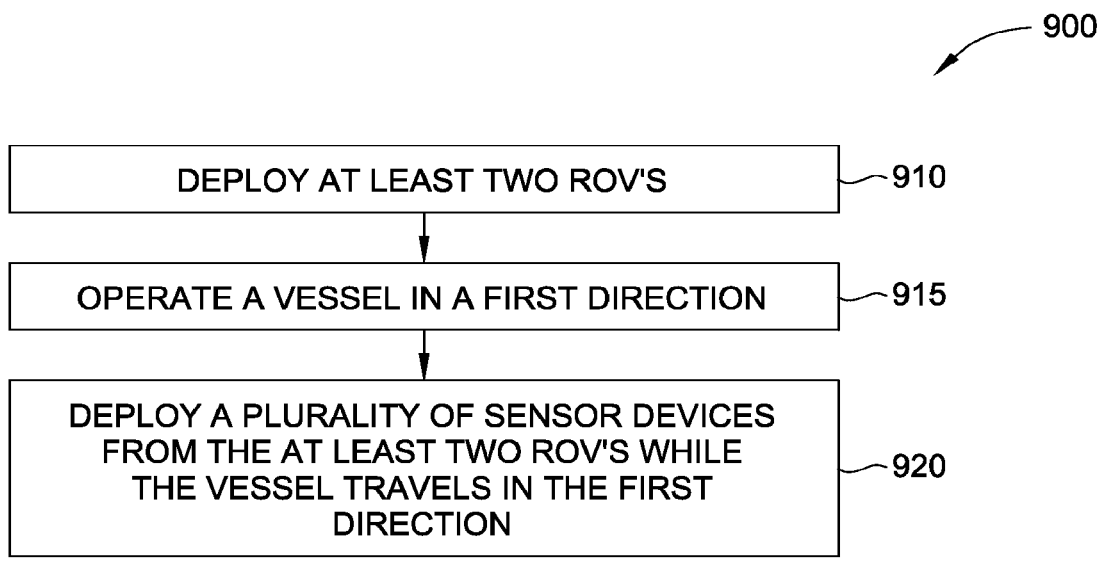
FIG. 9 is a flow chart showing another embodiment of a deployment method.

FIG. 9 is a flow chart showing another embodiment of a deployment method 900. The method 900 may be used to deploy a plurality of seismic sensor receiver lines in one pass of a first vessel as described in the above embodiments. The method begins at 910 using at least two ROV's coupled to the first vessel in a body of water. At 915, the vessel operates in a first direction in the body of water. The first direction may be a compass heading or other linear and/or directional path. At 920, a plurality of sensor devices are deployed from the at least two ROV's while the vessel travels in the first direction. The plurality of sensor devices may be deployed in a plurality of receiver lines comprising a pattern. The pattern may be an X/Y pattern in a mirror-image, an identical X/Y pattern, or other pattern using the at least two ROV's. In one embodiment, the plurality of receiver lines are substantially parallel to the first direction. In another embodiment, the plurality of receiver lines are substantially parallel to each other.

The deployment of multiple receiver lines has been determined empirically as described in FIG. 1. While setting the vessel speed to safe operating speed, the number of seismic sensor devices deployed in a specific time period was greater than the conventional deployment method in the same time period. In one example according to the embodiment described in FIG. 1, two receiver lines were deployed at a rate of about ten seismic sensor units per hour, while the conventional one pass method of deploying ten seismic sensor units in a single receiver line took approximately five hours. In one specific example using the embodiment described in FIG. 1, two receiver lines were deployed having 5 seismic sensor devices each (ten seismic sensor units total) at 400 meter spacings (distances $L_R$ and $L_C$). The vessel 5 was slowed to about one-half of the conventional speed. In this example, the one pass deployment of the two receiver lines resulted in a time savings of about thirty minutes as compared to conventional deployment of a single receiver line (ten seismic sensor units) in one pass at twice the travel speed. This time saving may be extrapolated to multiple columns up to and including several miles and when the receiver lines are completed, the second vessel will be utilized for many hours or days, dependent upon the number of columns or length of the receiver lines. While the second vessel is shooting, the first vessel continues to deploy other receiver lines in one pass. Thus, a buffer time for the first vessel may be created using the one pass multiple receiver line deployment method.

Using the embodiments described herein, the deployment time of seismic sensor devices is significantly minimized, which allows the second vessel to operate with minimal or no idle time waiting for receiver line placement. The decreased deployment time also minimizes the time the first vessel is operating on the water. The decreased time on the water also minimizes labor costs and fuel usage. The decreased time on the water also allows seismic array layouts to be completed in a time frame that coincides with fair weather windows. Thus, deployment (and/or retrieval) of the sensor devices is less likely to be suspended due to periods of foul weather. As the seismic sensor devices include batteries with a limited operational time, the shortened deployment time also increases the probability that the survey can be complete before exhaustion of the batteries of the seismic sensor devices. For example, a seismic survey utilizing one thousand sensor devices may be completed in one week, including deployment and shooting, as opposed to conventional deployment methods which may take many weeks to cover the same area. Retrieval of the sensor devices may be completed in another week using the methods described herein.

While the foregoing is directed to embodiments of the present invention, other and further embodiments of the invention may be devised without departing from the basic scope thereof, and the scope thereof is determined by the claims that follow.

What is claims is:

1. A method for deploying seismic sensors in a marine environment, comprising:
    deploying, from a vessel, a seismic sensor transfer device including a propulsion system, the seismic sensor transfer device configured to house and transport a plurality of seismic sensors;
    transferring at least one of the plurality of seismic sensors from the seismic sensor transfer device to a remotely operated vehicle;
    operating the remotely operated vehicle at a second speed different from a first speed at which the vessel is operating, the first speed greater than zero knots; and
    placing, by the remotely operated vehicle, the at least one seismic sensor on a seabed.

2. The method of claim 1, wherein transferring comprises:
    transferring, at a subsurface location, the at least one of the plurality of seismic sensors.

3. The method of claim 2, wherein transferring comprises:
    transferring, at a subsurface location above a seabed, the at least one of the plurality of seismic sensors.

4. The method of claim 2, wherein transferring comprises:
    transferring, at a subsurface location at a seabed, the at least one of the plurality of seismic sensors.

5. The method of claim 1, wherein the remotely operated vehicle comprises a seismic sensor storage compartment, and transferring comprises:
    transferring at least one of the plurality of seismic sensors from the seismic sensor transfer device to the seismic sensor storage compartment of the remotely operated vehicle.

6. The method of claim 5, wherein at least one of the seismic sensor transfer device and the seismic sensor storage compartment comprises a tray.

7. The method of claim 5, wherein at least one of the seismic sensor transfer device and the seismic sensor storage compartment comprises at least one of a container, a drone, a skid structure, a transfer skid, a basket, a rack, and a magazine.

8. The method of claim 1, wherein the vessel is operated at the first speed before transferring the at least one of the plurality of seismic sensors.

9. The method of claim 1, wherein the vessel is operated at the first speed after transferring the at least one of the plurality of seismic sensors.

10. The method of claim 1, wherein:
    transferring the at least one of the plurality of seismic sensors occurs at a subsurface location above a seabed; and
    the vessel is operated at the first speed after transferring the at least one of the plurality of seismic sensors.

11. The method of claim 1, wherein the seismic sensor transfer device includes a motor.

12. The method of claim 1, wherein the seismic sensor transfer device includes an on-board power supply.

13. A system for deploying seismic sensors in a marine environment comprising:
    a seismic sensor transfer device including a propulsion system, the seismic sensor transfer device configured to:
        house and transport a plurality of seismic sensors;
        deploy from a vessel operating at a first speed greater than zero knots; and
        provide at least one of the plurality of seismic sensors to a remotely operated vehicle; and
    the remotely operated vehicle configured to:
        receive the at least one of the plurality of seismic sensors from the seismic sensor transfer device;
        operate at a second speed different from the first speed; and
        place the at least one of the plurality of seismic sensors on a seabed.

14. The system of claim 13, wherein:
    the seismic sensor transfer device is further configured to transfer, to the remotely operated vehicle, the at least one of the plurality of seismic sensors at a subsurface location; and
    the remotely operated vehicle is further configured to receive, from the seismic sensor transfer device, the at least one of the plurality of seismic sensors at the subsurface location.

15. The system of claim 14, wherein the subsurface location is a subsurface location above a seabed.

16. The system of claim 14, wherein the subsurface location is a subsurface location at a seabed.

17. The system of claim 13, wherein the remotely operated vehicle comprises a seismic sensor storage compartment, and the remotely operated vehicle is further configured to:
    transfer at least one of the plurality of seismic sensors from the seismic sensor transfer device to the seismic sensor storage compartment.

18. The system of claim 17, wherein at least one of the seismic sensor transfer device and the seismic sensor storage compartment comprises a tray.

19. The system of claim 17, wherein at least one of the seismic sensor transfer device and the seismic sensor storage compartment comprises at least one of a container, a drone, a skid structure, a transfer skid, a basket, a rack, and a magazine.

20. The system of claim 17, wherein the seismic sensor transfer device comprises a movable platform configured to facilitate transfer of the seismic sensor device.

21. The system of claim 13, wherein:
    the seismic sensor transfer device is further configured to provide the at least one of the plurality of seismic sensors after the vessel is operated at the first speed; and the remotely operated vehicle is further configured to receive the at least one of the plurality of seismic sensors after the vessel is operated at the first speed.

22. The system of claim 13, wherein:

the seismic sensor transfer device is further configured to provide the at least one of the plurality of seismic sensors before the vessel is operated at the first speed; and the remotely operated vehicle is further configured to receive the at least one of the plurality of seismic sensors before the vessel is operated at the first speed.

23. The system of claim 13, wherein:

the seismic sensor transfer device is further configured to transfer, to the remotely operated vehicle, the at least one of the plurality of seismic sensors at a subsurface location above a seabed;

the remotely operated vehicle is further configured to receive, from the seismic sensor transfer device, the at least one of the plurality of seismic sensors at the subsurface location above the seabed, wherein the vessel is operated at the first speed after the remotely operated vehicle receives the at least one of the plurality of seismic sensors.

24. The system of claim 13, wherein the seismic sensor transfer device includes a motor.

25. The system of claim 13, wherein the seismic sensor transfer device includes an on-board power supply.

* * * * *